United States Patent
Wu (10) Patent No.: US 12,039,248 B2
(45) Date of Patent: Jul. 16, 2024

(54) RULE CHECK METHOD AND APPARATUS, AND STORAGE MEDIUM

(71) Applicant: CHANGXIN MEMORY TECHNOLOGIES, INC., Hefei (CN)

(72) Inventor: Bin Wu, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 405 days.

(21) Appl. No.: 17/471,252

(22) Filed: Sep. 10, 2021

(65) Prior Publication Data
US 2022/0269848 A1    Aug. 25, 2022

Related U.S. Application Data

(63) Continuation of application No. PCT/CN2021/103734, filed on Jun. 30, 2021.

(30) Foreign Application Priority Data

Feb. 22, 2021  (CN) .......................... 202110197091.2

(51) Int. Cl.
*G06F 30/398* (2020.01)
*G06F 111/16* (2020.01)
*G06F 111/20* (2020.01)

(52) U.S. Cl.
CPC ........ *G06F 30/398* (2020.01); *G06F 2111/16* (2020.01); *G06F 2111/20* (2020.01)

(58) Field of Classification Search
CPC .............. G06F 30/398; G06F 2111/04; G06F 2111/08; G06F 2119/12; G06F 2119/18;
(Continued)

(56) References Cited

U.S. PATENT DOCUMENTS 6,063,132 A    5/2000  DeCamp
9,087,174 B1   7/2015  Zhang et al.
(Continued)

FOREIGN PATENT DOCUMENTS

CN         1859158 A    11/2006
CN       101162477 A     4/2008
(Continued)

OTHER PUBLICATIONS

First Office Action of the Chinese application No. 202110197091.2, issued on Apr. 1, 2022, 16 pgs.

*Primary Examiner* — Binh C Tat
(74) *Attorney, Agent, or Firm* — Kilpatrick Townsend & Stockton LLP (57) ABSTRACT

The present application provides a design rule check method and apparatus, and a storage medium, which are applied to the field of chip verification. The method includes that: a DRC code file is acquired, multiple segments of DRC codes in the DRC code file are analyzed, the analyzed segments of DRC codes are classified, whether a code conflict exists in the segments of DRC codes is determined, and if the code conflict exists, a code conflict report is generated, the code conflict report being used to indicate a code position of the code conflict. By means of the method, the code error in the DRC code file can be quickly checked and positioned, assisting a tester in modifying a DRM file and the DRC file, so as to improve the execution efficiency of the DRC code, and meanwhile, shorten the time for DRC development.

12 Claims, 5 Drawing Sheets

(58) Field of Classification Search
CPC ........ G06F 30/30; G06F 30/33; G06F 30/367;
G06F 30/00; G06F 30/39; G06F 2111/16;
G06F 2111/20; G06F 9/5072; G06F
30/327; G06F 2119/02; G06F 30/3308;
G06F 30/333; G06F 2115/08; G06F
30/3323; G06F 8/443; G06F 9/3001;
G06F 9/30043; G06F 9/30065; G06F
9/3012; G06F 9/30123; G06F 9/30134;
G06F 9/30189; G06F 9/381; G06F
9/3836; G06F 9/38585; G06F 9/3867;
G06F 9/3885; G06F 9/3887; G06F
9/3889; G06F 16/58; G06F 16/907; G06F
18/213; G06F 18/214; G06F 18/217;
G06F 18/23; G06F 18/23211; G06F
18/24; G06F 18/2415; G06F 18/2431;
G06F 30/20; G06F 30/31; G06F 30/392;
G06F 16/24573; G06F 16/24575; G06F
16/288; G06F 16/51; G06F 16/9535;
G06F 2119/06; G06F 30/394; G06F
9/455; G03F 1/36; G03F 1/84; G03F
7/70441; G03F 7/705; G03F 1/44; G03F
1/70; G03F 1/78; G03F 7/70525; G03F
7/7065; H01L 21/67005

USPC .................................................. 716/110–116
See application file for complete search history.

(56) References Cited

U.S. PATENT DOCUMENTS

| | | |
|---|---|---|
| 9,158,885 B1 | 10/2015 | Gray et al. |
| 2010/0270671 A1 | 10/2010 | Holesovsky |
| 2013/0074024 A1* | 3/2013 | Chase ................... G06F 30/398 |
| | | 716/112 |
| 2014/0282329 A1* | 9/2014 | Aggarwal ............. G06F 30/398 |
| | | 716/112 |
| 2015/0095865 A1 | 4/2015 | Bhattacharya et al. |
| 2015/0324510 A1* | 11/2015 | Aggarwal ............. G06F 30/398 |
| | | 716/112 |

FOREIGN PATENT DOCUMENTS

| | | |
|---|---|---|
| CN | 101408923 A | 4/2009 |
| CN | 105740486 A | 7/2016 |
| CN | 108763815 A | 11/2018 |
| CN | 110489830 A | 11/2019 |
| CN | 112800705 A | 5/2021 |

\* cited by examiner

RULE CHECK METHOD AND APPARATUS, AND STORAGE MEDIUM

CROSS-REFERENCE TO RELATED APPLICATION(S)

This is a continuation of international application PCT/CN2021/103734, filed on Jun. 30, 2021, which claims priority to Chinese Patent Application No. 202110197091.2, filed on Feb. 22, 2021. The contents of international application PCT/CN2021/103734 and Chinese Patent Application No. 202110197091.2 are hereby incorporated by reference in their entireties.

BACKGROUND

A sign off flow is adopted for general chip design, that is, when design data is completed, whether the current design violates a design rule is checked through Design Rule Check (DRC).

According to a scheme in the related art, by executing a DRC code file, a test pattern is generated, the test pattern with an error is determined, and the design rule and DRC codes are optimized by a designer based on the test pattern. In general, at the beginning of the design, there may be millions of errors, and the designer needs to examine the error one by one, thereby resulting in the extension of a chip design period.

SUMMARY

The present application relates to the field of chip verification, and in particular to a design rule check method and apparatus, and a storage medium.

The present application provides a design rule check method and apparatus, and a storage medium.

In a first aspect, an embodiment of the present application provides a design rule check method, including the following operations.

A DRC code file is acquired.

Multiple segments of DRC codes in the DRC code file are analyzed, the analyzed segments of DRC codes are classified, and whether a code conflict exists in the segments of DRC codes is determined.

If the code conflict exists, a code conflict report is generated, the code conflict report being used to indicate a code position of the code conflict.

In a second aspect, the embodiment of the present application provides a design rule check apparatus, including an acquisition module and a processing module.

The acquisition module is configured to acquire a DRC code file.

The processing module is configured to analyze multiple segments of DRC codes in the DRC code file, classify the analyzed segments of DRC codes, and determine whether a code conflict exists in the segments of DRC codes; if the code conflict exists, generate a code conflict report, the code conflict report being used to indicate a code position of the code conflict.

In a third aspect, the embodiment of the present application provides a design rule check apparatus, including at least one processor and a memory.

The memory is in communication connection with the at least one processor.

The memory stores an instruction executable by the at least one processor. The instruction is executed by the at least one processor to enable the design rule check apparatus to execute any method in the first aspect of the present application.

In a fourth aspect, the embodiment of the present application provides a computer-readable storage medium. The computer-readable storage medium stores a computer execution instruction. When the computer execution instruction is executed by a processor, the processor is enabled to execute any method in the first aspect of the present application.

In a fifth aspect, the embodiment of the present application provides a computer program product, including a computer program. When the computer program is executed by a processor, any method in the first aspect of the present application is executed.

DETAILED DESCRIPTION

Technical schemes in embodiments of the present application will be clearly and completely described below in combination with the accompanying drawings in the embodiments of the present application. Apparently, the described embodiments are only a part of the embodiments of the present application and not all the embodiments. Based on the embodiments in the present application, all other embodiments obtained by those skilled in the art without involving any inventive effort fall within the protection scope of the present application.

The terms "first", "second", and the like in the specification and claims of the present application and in the above drawings are used to distinguish similar objects and unnecessarily for describing a specific sequence or sequential order. It is to be understood that such data may be interchangeable where appropriate, so that the embodiments of the present application described herein can be, for example, implemented in a sequence in addition to those illustrated or described herein.

Furthermore, the terms "include" and "having", as well as any variations thereof, are intended to cover a non-exclusive enclosure, for example, a process, a method, a system, a product, or a component that includes a series of steps or elements is not necessarily limited to those expressly listed steps or elements, but may include other steps or elements not expressly listed or inherent to such process, method, product, or component.

Reference will first be made briefly to the related terms of the embodiment of the present application.

The following check regions are involved in the chip design: a Switch Control (SWC) module, a Sense Amplify (SA) Sub Word-line Driver (SWD), and a Peripheral (PERI).

The PERI includes: an X-Decode (XDEC), a Y-Decode (Y-DEC), Electrostatic Discharge (ESD), a seal-ring, and the like.

An active district (OD) is a region where an active device is made on a silicon wafer.

N-Metal-Oxide-Semiconductor is N-Metal-Oxide-Semiconductor (NMOS).

In a DRC development flow, a designer generates a DRC code file based on a Design Rule Manual (DRM), and the DRC code file is used to verify whether a design of each check region of a chip satisfies a requirement of the DRM. The DRC code file includes DRC codes corresponding to a plurality of design rules, the DRC codes of the same type of design rule may overlap, for example, contain the same check item, and the DRC codes of the same type of design rule may conflict in different check regions, for example, numerical range definitions of the same check item are different.

Exemplarily, Table 1 is a configuration table of a design rule based on polysilicon POLY space. As shown in Table 1, the design rule PO_S_01 defines that the space between runner POLY is greater than or equal to 0.2 μm, and the design rule PO_S_05 defines that the space between POLY is greater than or equal to 0.185 μm. These several design rules may be implemented using similar DRC codes. However, if these design rules are not clearly distinguished in a design process, an error is reported when a layout is verified, so that the number of iterations of the development is increased, and the development time is prolonged.

TABLE 1

| Design rule ID | Definition | Numerical range |
|---|---|---|
| PO_S_01 | Min-runner POLY to runner POLY spacing: SA, SWD, SWC | ≥0.2 |
| PO_S_05 | Min-POLY to POLY spacing | ≥0.185 |
| PO_S_08 | Min-POLY to POLY spacing: SA, SWD, SWC | ≥0.25 |
| PO_S_28 | Min-POLY to POLY spacing for NMOS in XDEC | ≥0.165 |
| SL_S_01 | Min-POLY to POLY spacing in seal ring | =0.15 |
| SL_S_02 | Min-POLY to POLY spacing in outside seal ring | ≥0.35 |
| PGRES_S_01 | Min-POLY resistor to POLY resistor spacing in ESD region | ≥0.5 |

Figure 1:
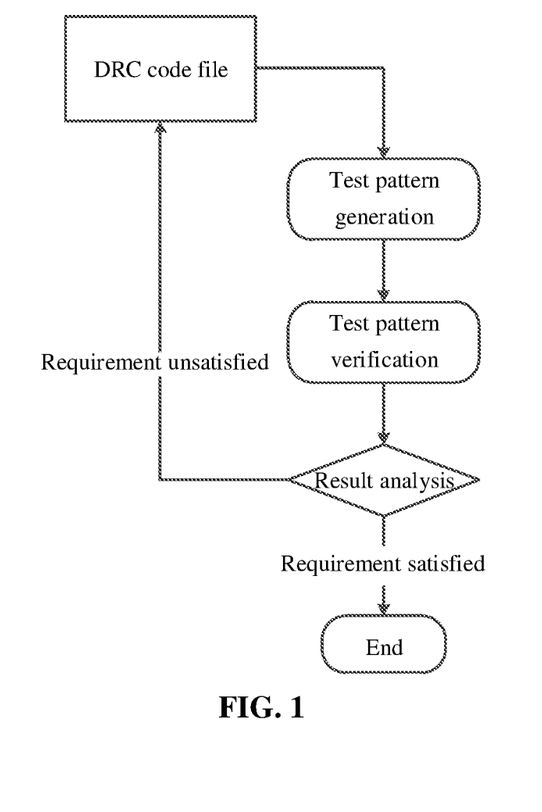
FIG. 1 is a schematic diagram of a DRC development flow in the related art.

FIG. 1 is a schematic diagram of a DRC development flow in the related art. As shown in FIG. 1, in the DRC development flow, after the DRC code file is acquired, the DRC code file is directly executed, and by generating a test pattern, possible errors in the DRC code are manually examined and confirmed. If the designer does not define the DRM design rule clearly at the beginning of the chip design, it is liable to report an error in the verification of the chip design, and the error may be millions of errors. When chip design data is submitted, the above error should not occur, and the designer needs to continuously modify design parameters, and execute the DRC code file and verify a test result many times, so that the number of iterations of the development is huge, and the development efficiency is low.

In view of the above, the present application provides a design rule check method. The inventor considers, before a test image is generated, adding a design rule check apparatus. The apparatus is configured to perform code analysis on the acquired DRC code file, search out a segment of DRC codes with a conflict, and generate a corresponding check report so that the designer can correct the DRC code file or DRM based on the check report, the conflict or redundancy of the DRC codes in the DRC code file is avoided, the execution efficiency of the DRC code is improved, and the DRC development time is shortened by at least 10%. The time for verifying a test layout is also shortened because the number of reported errors is reduced.

Figure 2:
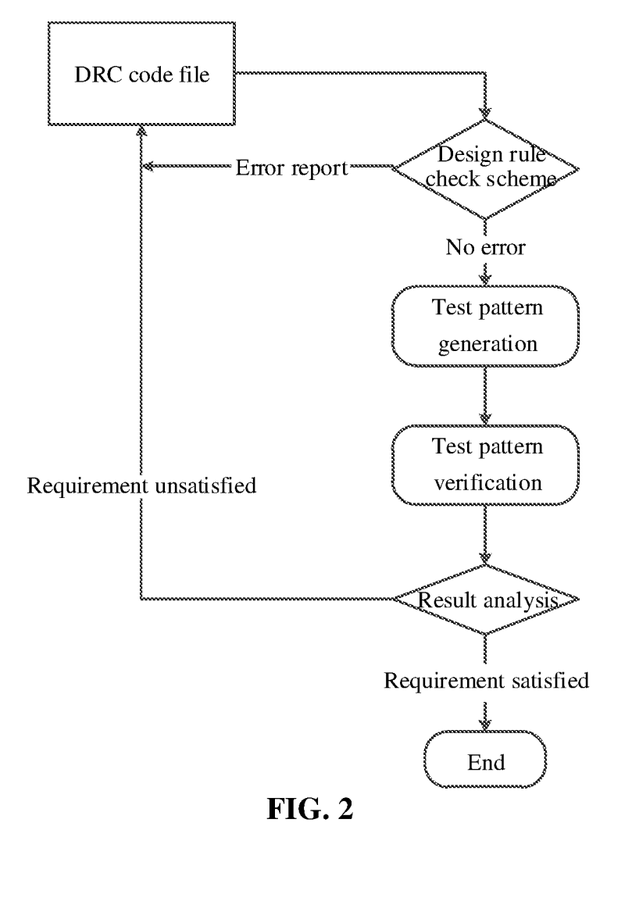
FIG. 2 is a schematic diagram of a DRC development flow provided by an embodiment of the present application.

FIG. 2 is a schematic diagram of a DRC development flow provided by an embodiment of the present application. As shown in FIG. 2, after the DRC code file is acquired, the design rule check apparatus intelligently checks the code conflict or code redundancy in the DRC code file based on the design rule check scheme provided by the present application, and generates a check report for indicating a position of an error code or a redundant code if the code conflict or code redundancy exists in the DRC code file. A designer is waited for to modify the DRC code file or DRM. Through the above correction, when the code conflict or code redundancy does not exist in the DRC code file, a DRC code file verification flow is entered, a test pattern is generated by executing the DRC code file, whether the test pattern satisfies a design requirement is verified and analyzed, an analysis report is generated if the design requirement is not satisfied, and the designer is waited for to correct the DRC code file or the DRM. If a design requirement is satisfied, a design flow is ended.

The design rule check scheme provided by the present application will be illustrated below in detail with specific embodiments. The following specific embodiments may be combined, and the same or similar concepts or procedures may not be repeated in some embodiments.

Figure 3:
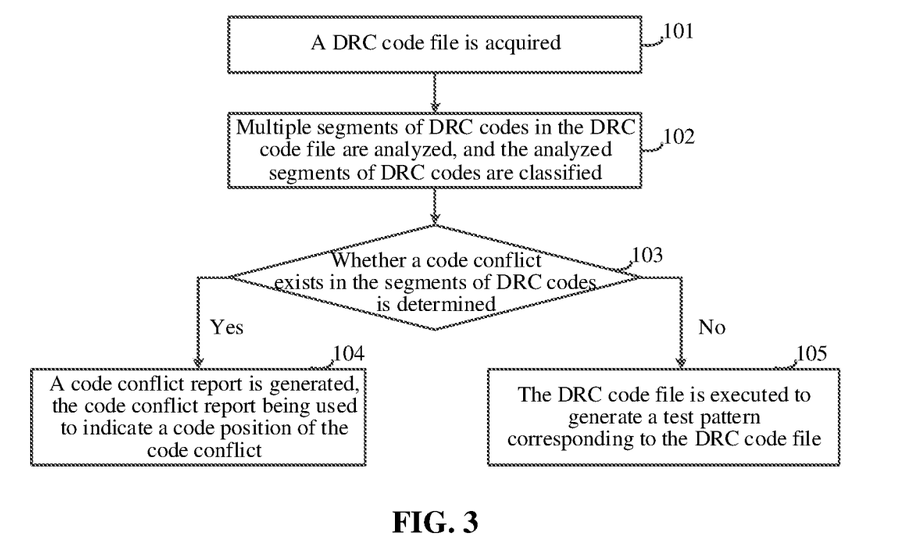
FIG. 3 is a flowchart of a design rule check method provided by an embodiment of the present application.

FIG. 3 is a flowchart of a design rule check method provided by an embodiment of the present application. As shown in FIG. 3, the design rule check method of the embodiment mainly includes the following steps.

At S101, a DRC code file is acquired.

The DRC code file of the embodiment includes multiple segments of DRC codes. Each segment of DRC codes corresponds to a design rule. In the field of chip design, the design rule includes at least one design rule of width and area based on a semiconductor structure in a chip, space, enclosure relationship and extension relationship between semiconductor structures. In general, the DRC code file includes segments of DRC codes based on different design rules. There is a case where DRC codes correspond to the same type of design rule.

The design rule based on the width is used to define the width of the semiconductor structure, for example, to define the width of the semiconductor structure to be less than the preset width.

The design rule based on the space is used to define the space between the semiconductor structures, for example, to define the space between the semiconductor structures to be greater than preset space.

The design rule based on the area is used to define the area of a chip region occupied by the semiconductor structure, for example, to define the area of the chip region occupied by the semiconductor structure to be less than a preset area value.

The design rule based on the enclosure is used to define a positional relationship between semiconductors, for example, to define the enclosure of another semiconductor structure within a certain semiconductor structure.

The design rule based on the extend is used to define another positional relationship between the semiconductors, for example, to define the length of polysilicon extending beyond a semiconductor layer to be greater than preset length so as to avoid a short circuit.

The semiconductor structure of the embodiment may be a semiconductor layer, a semiconductor module, a semiconductor device, and the like, and the embodiment of the present application does not limit this.

It will be appreciated that each segment of DRC codes may be used to verify whether the semiconductor structure in a certain check region of the chip satisfies a design requirement, for example, a first segment of DRC codes is used to verify whether the space between the semiconductor structures in an SWD of the chip satisfies the design requirement, a second segment of DRC codes is used to verify whether the width of the semiconductor structure in the SA of the chip satisfies the design requirement, and a third segment of DRC codes is used to verify whether the area of the chip occupied by an X encode of the chip satisfies the design requirement, and the like.

At S102, the segments of DRC codes in the DRC code file are analyzed.

At S103, the analyzed segments of DRC codes are classified, and whether a code conflict exists in the segments of DRC codes is determined.

If the code conflict exists, S104 is executed.

If the code conflict does not exist, S105 is executed.

At S104, if the code conflict exists, a code conflict report is generated, the code conflict report being used to indicate a code position of the code conflict.

At S105, the DRC code file is executed, and the test pattern corresponding to the DRC code file is generated.

In one embodiment of the present application, the analyzed segments of DRC codes may be classified according to a type of the design rule corresponding to each segment of DRC codes to obtain the segment of DRC codes of each type of design rule; and whether the code conflict exists in the segment of DRC codes of each type of design rule is determined.

In the embodiment, each segment of DRC codes corresponds to one design rule. By analyzing each segment of DRC codes, derivative layer information of the design rule corresponding to each segment of DRC codes is obtained. The derivative layer information is used to indicate logic operations of the DRC codes. If the logic operations of two segments of DRC codes are the same, the design rules of the two segments of DRC codes may be determined to be the same type of design rule, and the two segments of DRC codes may be classified into one type for subsequent code conflict analysis.

Specifically, whether the code conflict exists in the segment of DRC codes of each design rule may be determined in the following manner: whether the numerical range fields of the same check item in the segments of DRC codes of each type of design rule are the same is determined. If the numerical range fields of the same check item in the segments of DRC codes of the same type of design rule are not exactly the same, it is determined that the code conflict exists in the segments of DRC codes of the design rule; and if the numerical range fields of the same check item in the segment of DRC codes of the same type of design rule are the same, it is determined that the code conflict does not exist in the segments of DRC codes of the design rule.

In the embodiment, the check item relates to the type of design rule. If the design rule is the design rule based on the space, the check item is the space between semiconductor structures; if the design rule is the design rule based on the area, the check item is the area of the semiconductor structure; and if the design rule is the design rule based on the width, the check item is the width of the semiconductor structure.

Exemplarily, the design rule based on the space is taken as an example, by analyzing multiple segments of DRC codes, the DRC codes of which the derivative layer information indicates space operation are classified into one type, code conflict analysis is performed on the segment of DRC codes of this type of design rule, and whether the same check item in the segments of DRC codes of the design rule based on the space, that is, numerical range fields of the space between the semiconductor structures is the same is determined. If the numerical range field is not exactly the same, it is determined that the code conflict exists in the segments of DRC codes of this type of design rule; and if the numerical range fields are the same, it is determined that the code conflict does not exist in the segment of DRC codes of this type of design rule.

The technical scheme of the above embodiment is described in detail below with reference to several specific examples.

As an example, the segments of DRC codes in the DRC code file are analyzed to obtain a derivative layer list for the design rule PO_S_01 (see Table 2), and the derivative layer list for the design rule PO_S_08 (see Table 3). The derivative layer list defines the logic operation of the design rule. PO represents polysilicon POLY, and S represents the space.

TABLE 2

| Derivative layer of PO_S_01 | Definition |
|---|---|
| PO_S_01_A | Copy POLY |
| PO_S_01_B1 | ((POLY not POLY;dummy) not OD) and SA |
| PO_S_01_B2 | ((POLY not POLY;dummy) not OD) and SWD |
| PO_S_01_B3 | ((POLY not POLY;dummy) not OD) and SWC |

TABLE 3

| Derivative layer of PO_S_08 | Definition |
|---|---|
| PO_S_08_A | Copy POLY |
| PO_S_08_B1 | ((POLY not POLY;dummy) not OD) and SA |
| PO_S_08_B2 | ((POLY not POLY;dummy) not OD) and SWD |
| PO_S_08_B3 | ((POLY not POLY;dummy) not OD) and SWC |

It is to be noted that in Table 2 and Table 3, PO_S_01_A and PO_S_08_A may represent reference layers of the chip in a certain check region, PO_S_01_B1 and PO_S_08_B1 may represent the semiconductor layers of the chip in the check region SA, PO_S_01_B2 and PO_S_08_B2 may represent the semiconductor layers of the chip in the check region SWD, and PO_S_01_B3 and PO_S_08_B3 may represent semiconductor layers of the chip in the check region SWC.

Comparing Tables 2 and 3, the logic operations of the design rules PO_S_01 and PO_S_08 are the same, therefore, it may be determined that the design rules PO_S_01 and PO_S_08 are the same type of design rule, both of which are used to define the space between the semiconductor structures.

Figure 4:
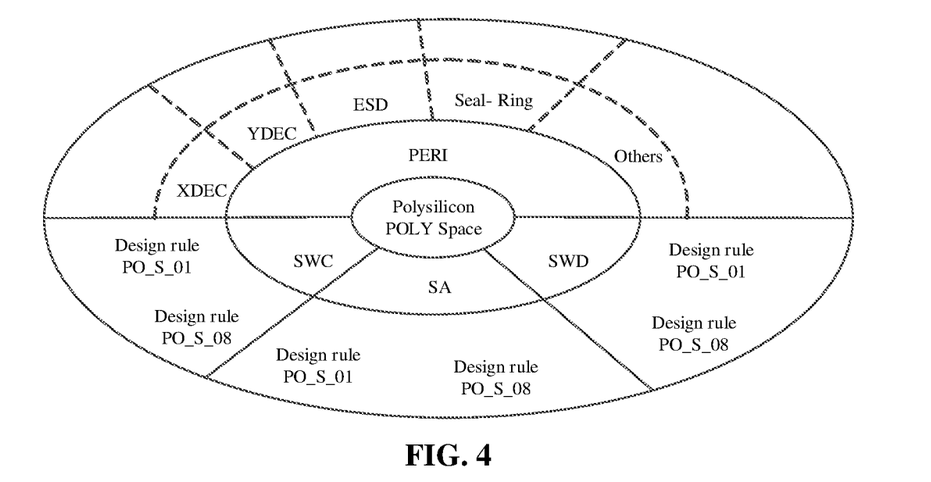
FIG. 4 is a first distribution diagram of a space-based design rule in each check region of a chip.

Exemplarily, FIG. 4 is a first distribution diagram of a space-based design rule in each check region of a chip. As shown in FIG. 4, the design rule PO_S_01 and the design rule PO_S_08 cover three check regions of the chip, which are SWC, SA and SWD, respectively. As can be seen from Table 2 and Table 3, both the design rules PO_S_01 and PO_S_08 are the design rules based on the space of the semiconductor structures in the chip. The numerical range fields of the check item of the same type of design rule should be the same in different check regions or the same check region so as to avoid the code conflict of the segment of DRC codes. It will be appreciated that other check regions of the chip may also correspond to other types of design rules, for example, the design rules based on the area, the extend, and the like (not shown in FIG. 4), and the embodiment of the present application does not limit this.

In the example, since the logic operations of the PO_S_01 and the PO_S_08 are the same, the DRC codes corresponding to the PO_S_01 and the PO_S_08 may be classified into one type for the code conflict analysis. Whether the numerical range fields of the check items (space) in the segment of DRC codes corresponding to the PO_S_01 and the PO_S_08 are the same needs to be further determined. Table 4 shows limitations on the numerical range of the check term (space) between the derivative layers of the design rules PO_S_01 and PO_S_08. Since threshold values of the space are 0.2 µm and 0.25 µm respectively and are different, it may be determined that the code conflict exists in the segment of DRC codes corresponding to the PO_S_01 and the PO_S_08, and a code conflict report needs to be generated. There are two main causes of the code conflict as follows that: one is that the DRC codes corresponding to the two types of design rules have errors, and the other is that the two types of design rules themselves have the errors. Therefore, the designer needs to manually modify the DRC code or DRM according to the code conflict report.

TABLE 4

| Design rule ID | Derivative layer A | Derivative layer B | Check item | Numerical range limit |
| --- | --- | --- | --- | --- |
| PO_S_01 | PO_S_01_A | PO_S_01_B1 | Space | ≥0.2 |
| PO_S_01 | PO_S_01_A | PO_S_01_B2 | Space | ≥0.2 |
| PO_S_01 | PO_S_01_A | PO_S_01_B3 | Space | ≥0.2 |
| PO_S_08 | PO_S_08_A | PO_S_08_B1 | Space | ≥0.25 |
| PO_S_08 | PO_S_08_A | PO_S_08_B2 | Space | ≥0.25 |
| PO_S_08 | PO_S_08_A | PO_S_08_B3 | Space | ≥0.25 |

The above example shows the case that the difference of the rule definitions of the design rules based on the space will result in the DRC code conflict. As shown in Table 4, when the check regions defined by the design rules are the same, the threshold values of the numerical range fields of the check item may be different, and the designer needs to correct the code conflict fields in the DRC codes in time.

As another example, the multiple segments of DRC codes in the DRC code file are analyzed to obtain a derivative layer list for the design rule PO_S_05 (see Table 5), and a derivative layer list for the design rule SL_S_01 (see Table 6). SL represents a seal ring, pch POLY represents polysilicon connected with a P-type MOS transistor, nch POLY represents polysilicon connected with an N-type MOS transistor, and drawing represents a connecting line on the chip.

TABLE 5

| Derivative layer of PO_S_05 | Definition |
| --- | --- |
| PO_S_05_A | Copy POLY |
| PO_S_05_B | (or POLY;pch POLY;nch POLY;SL POLY;drawing) not OD |

TABLE 6

| Derivative layer of SL_S_01 | Definition |
| --- | --- |
| SL_S_01_A | Copy POLY |
| SL_S_01_B | POLY;SL and SealRing |

In Table 5 and Table 6, both test variables used in the logic operation of the design rule PO_S_05 and the design rule SL_S_01 include "POLY; SL", that is, the two design rules have the same check item, so that the design rule PO_S_05 and the design rule SL_S_01 may be determined as the same type of design rule, both of which are used to define the space between the semiconductor structures.

TABLE 7

| Design rule ID | Derivative layer A | Derivative layer B | Check item | Numerical value |
| --- | --- | --- | --- | --- |
| PO_S_05 | PO_S_05_A | PO_S_05_B | Space | ≥0.185 |
| SL_S_01 | SL_S_01_A | SL_S_01_B | Space | =0.15 |

Table 7 shows limitations on the numerical range of the check item (space) between the derivative layers of the design rules PO_S_05 and SL_S_01. Since the threshold values of the space are 0.185 µm and 0.15 µm respectively and are different and judgment conditions (that is, judgment symbols, for example, the judgment symbol of the PO_S_05 is greater than or equal to, and the judgment symbol of the SL_S_01 is equal to) are also different, it may be determined that the code conflict exists in the DRC codes corresponding to the design rules PO_S_05 and SL_S_01, and the code conflict report needs to be generated. The designer needs to adjust the DRC codes of the PO_S_05 or the SL_S_01 according to the code conflict report, for example, to unify space thresholds and judgment conditions in the PO_S_05 and the SL_S_01; or to delete the check item POLY;SL in the PO_S_05 or the SL_S_01; SL, and then separately determine the design rule for the POLY;SL.

The above example shows the case that overlap exists in the check regions of the design rules based on the space and the limitations on the numerical range of the check terms are different, which will result in the DRC code conflict. As shown in Table 7, the overlap exists in the test variables "POLY; SL" used by the two design rules, and the code conflict may be avoided by correcting the DRC code of one design rule, for example, correcting the DRC code of the PO_S_05, deleting the POLY;SL, and separately checking the space at the SL_S_01.

As another example, the multiple segments of DRC codes in the DRC code file are analyzed to obtain a derivative layer list for the design rule PO_S_05 (see Table 5), and a derivative layer list for the design rule PO_S_28 (see Table 8).

TABLE 8

| Derivative layer of PO_S_28 | Definition |
|---|---|
| PO_S_28_A | Copy POLY |
| PO_S_28_B | (((or POLY;pch POLY;nch POLY;SL POLY;drawing) and OD) and NSD) and XDEC |

Figure 5:
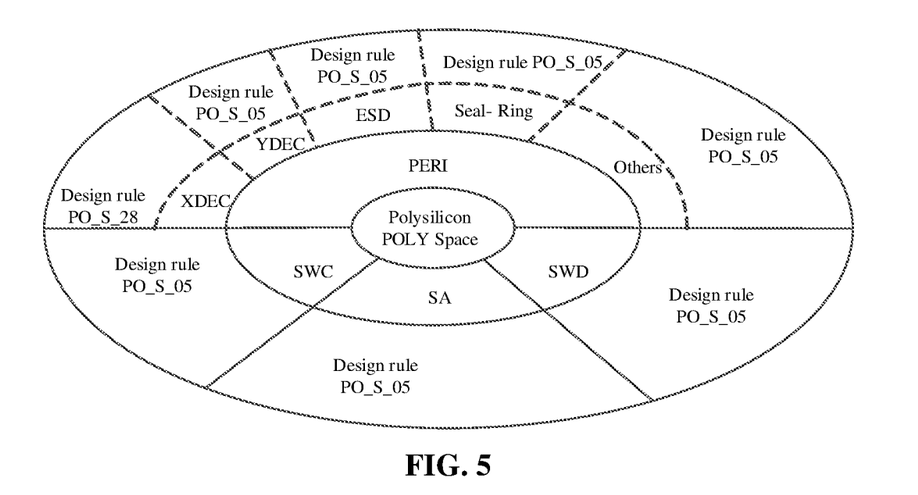
FIG. 5 is a second distribution diagram of a space-based design rule in each check region of a chip.

Exemplarily, FIG. 5 is a second distribution diagram of a space-based design rule in each check region of a chip. As shown in FIG. 5, the design rule PO_S_05 covers the check regions of the chip as follows: SWC, SA, SWD, and peripheral XDEC, YDEC, ESD, seal-ring, and the like. The check region of the chip covered by the design rule PO_S_28 is the peripheral XDEC.

In Table 5 and Table 8, both test variables used in the logic operation of the design rule PO_S_05 and the design rule PO_S_28 include "POLY; SL", that is, the two design rules have the same check item, so that the design rule PO_S_05 and the design rule PO_S_28 may be determined as the same type of design rule, both of which are used to define the space between the semiconductor structures.

TABLE 9

| Design rule ID | Derivative layer A | Derivative layer B | Check item | Numerical range limit |
|---|---|---|---|---|
| PO_S_05 | PO_S_05_A | PO_S_05_B | Space | ≥0.185 |
| PO_S_28 | PO_S_28_A | PO_S_28_B | Space | ≥0.165 |

Table 9 shows limitations on the numerical range of the check term (space) between the derivative layers of the design rules PO_S_05 and PO_S_28. Since threshold values of the space are 0.185 µm and 0.165 µm respectively and are different, it may be determined that the code conflict exists in the DRC codes corresponding to the design rules PO_S_05 and the PO_S_28, and a code conflict report needs to be generated. The designer needs to adjust the DRC code of the PO_S_05 according to the code conflict report, for example, to delete NMOS in XDEC from the DRC code of PO_S_05.

The above example shows the case that overlapping exists in the check regions of the design rules based on the space and the limitations on the numerical range of the check item are different, which will result in the DRC code conflict. The code conflict may be avoided by correcting the DRC code of one design rule, for example, correcting the DRC code of the PO_S_05, and deleting the NMOS code in the XDEC.

Based on the above examples, it can be seen that confirming whether the code conflict exists in the segment of DRC codes is mainly determining whether the numerical range fields having the same check item in the DRC codes of the same type of design rule are different, and if the numerical range fields of the same check item in two rules of the same type of design rule are different, it may be determined that the code conflict exists in the segment of DRC codes of the design rule.

It is to be noted that the numerical range field of the check item includes a numerical field and a relationship field, and the relationship field includes: greater than, equal to, smaller than, greater than or equal to, and smaller than or equal to. The difference of the numerical range field includes difference in terms of at least one of the numerical field or the relationship field.

According to the design rule check method provided by the embodiment, the DRC code file is checked by acquiring the design rule, the multiple segments of DRC codes in the DRC code file are analyzed, the analyzed multiple segments of DRC codes are classified, whether code conflicts exist in the multiple segments of DRC codes is determined, and if the code conflicts exist, a code conflict report is generated, the code conflict report being used to indicate the code position of the code conflict. By means of the method, the code error in the DRC code file can be quickly checked and positioned, assisting a tester in modifying a DRM file and the DRC file, so as to improve the execution efficiency of the DRC code, and meanwhile, shorten the time for DRC development.

In one or more embodiments, based on the above embodiment, in addition to determination of whether a code conflict exists in segments of DRC codes, the design rule check method further includes the following operation.

Whether code overlapping exists in the segments of DRC codes is determined, and if the code overlapping exists, a code overlapping report is generated, the code overlapping report being used to indicate the code position of the code overlapping. A designer may delete, according to an overlapping position indicated by the code overlapping report, part of DRC codes in the DRC code file, thereby reducing redundancy of the DRC codes.

Exemplarily, as shown in Table 1, the design rule PGRES_S_01 in the DRM file is defined as "Min-PO resistor to PO resistor spacing in ESD region". After the DRC code corresponding to the design rule PGRES_S_01 is analyzed, the obtained definition of the derivative layer PGRES_S_01_B of the design rule PGRES_S_01 is "POLY and POLY;res". It is assumed that the definition of the derivative layer PO_S_28_B of the design rule PO_S_28 is also "POLY and POLY;res". Based on the design rule check scheme of the above embodiment, a code overlapping report will be generated, and based on the code overlapping report, the designer may modify the definition of the derivative layer PGRES_S_01_B of the PGRES_S_01 to be "POLY and POLY;res and ESD" and modify the definition of the derivative layer PO_S_28_B of the PO_S_28 to be "POLY and POLY;res not ESD", thereby avoiding the code error report due to the unclear definition of the derivative layer.

Figure 6:
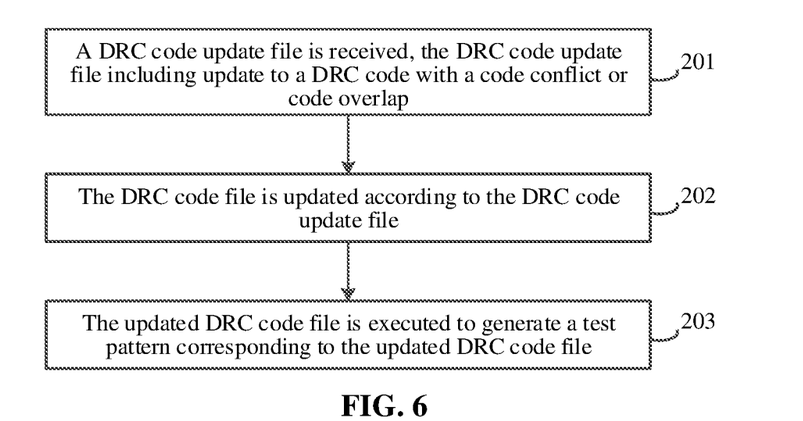
FIG. 6 is a flowchart of another design rule check method provided by an embodiment of the present application.

FIG. 6 is a flowchart of a design rule check method provided by an embodiment of the present application. As shown in FIG. 6, after the code conflict report or the code overlapping report is sent, the design rule check method of the embodiment further includes the following operations.

At S201, a DRC code update file is received, the DRC code update file including update to the DRC code with the code conflict or the code overlapping.

At S202, the DRC code file is updated according to the DRC code update file.

At S203, the updated DRC code file is executed to generate a test pattern corresponding to the updated DRC code file, the test pattern being used to verify whether a chip design satisfies a design requirement.

The update to the DRC code includes: deletion, modification, addition, and the like to the DRC code.

The test pattern corresponding to the DRC code file may be understood as a layout of each region of a chip generated after the DRC code is executed. In general, check item of each type of design rule in the DRC code file is different. The layout of each region is continuously adjusted and the quality of the DRC code is verified by updating the DRC code file.

By optimizing and updating the DRC code file in the embodiment, the DRC code file with the lower error rate may be generated, the test pattern is generated based on the optimized DRC code file, and the optimized DRC code is further verified, so that the execution efficiency of the DRC code is improved, and meanwhile, the time for DRC development is shortened.

According to the embodiment of the present application, the design rule check apparatus may be divided into function modules according to the above method embodiment, for example, may be divided into various function modules corresponding to respective functions, or may integrate two or more functions into one processing module. The above integrated module may be implemented either in hardware or in a software function module. It is to be noted that the division into the modules in the embodiment of the present application is illustrative and is only logic function division, and that additional division manners are possible for practical implementation. An example of dividing each function module corresponding to each function is described below.

Figure 7:
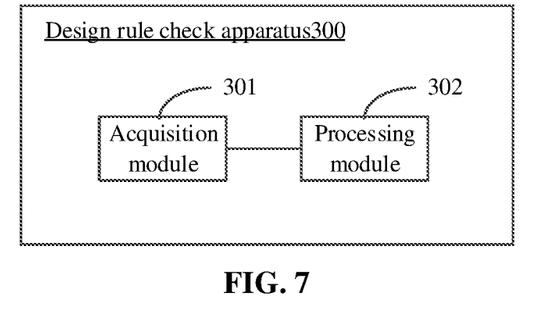
FIG. 7 is a first structural diagram of a design rule check apparatus provided by an embodiment of the present application.

FIG. 7 is a first structural diagram of a design rule check apparatus provided by an embodiment of the present application. As shown in FIG. 7, the design rule check apparatus 300 of the embodiment includes an acquisition module 301 and a processing module 302.

The acquisition module 301 is configured to acquire a DRC code file.

The processing module 302 is configured to analyze multiple segments of DRC codes in the DRC code file, classify the analyzed segments of DRC codes, and determine whether a code conflict exists in the segments of DRC codes; and if the code conflict exists, a code conflict report is generated, the code conflict report being used to indicate a code position of the code conflict.

In one embodiment of the present application, the processing module 302 is specifically configured to perform the following operations.

The analyzed segments of DRC codes are classified according to a type of a design rule corresponding to each segment of DRC codes to obtain a segment of DRC codes of each type of design rule.

Whether the code conflict exists in the segment of DRC codes of each type of design rule is determined.

In one embodiment of the present application, the design rule includes at least one design rule of width and area based on a semiconductor structure in a chip, space, enclosure relationship and extension relationship between semiconductor structures of the chip.

In one embodiment of the present application, the processing module 302 is specifically configured to perform the following operations.

Whether a numerical range field of the same check item in the segment of DRC codes of each type of design rule is the same is determined, and if the numerical range field of the same check item is not exactly the same, it is determined that the code conflict exists in the segment of DRC codes.

In one embodiment of the present application, the processing module 302 is further configured to perform the following operation.

Whether code overlapping exists in the multiple segments of DRC codes is determined, and if the code overlapping exists, a code overlapping report is generated, the code overlapping report being used to indicate the code position of the code overlapping.

Figure 8:
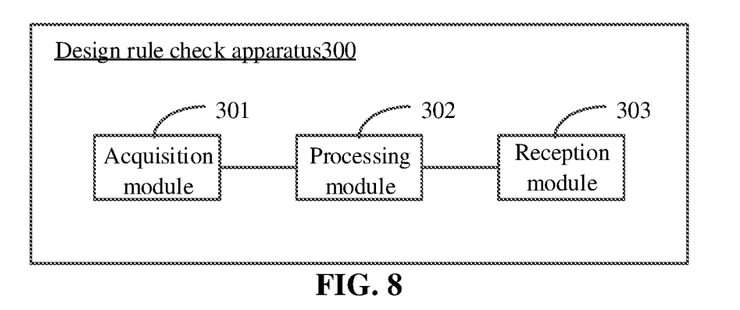
FIG. 8 is a second structural diagram of a design rule check apparatus provided in the embodiment of the present application.

FIG. 8 is a second structural diagram of a design rule check apparatus provided in the embodiment of the present application. On the basis of the apparatus shown in FIG. 7, as shown in FIG. 8, the design rule check apparatus 300 of the present embodiment further includes a reception module 303.

The reception module 303 is configured to receive a DRC code update file, the DRC code update file including update to the DRC code with the code conflict or code overlapping.

The processing module 302 is further configured to update the DRC code file according to the DRC code update file; and execute the updated DRC code file to generate a test pattern corresponding to the updated DRC code file, the test pattern being used to verify whether a chip design satisfies a design requirement.

The design rule check apparatus provided by the embodiment of the present application is configured to execute each step in any foregoing method embodiment, an implementation principle and a technical effect are similar and will not be described in detail herein.

Figure 9:
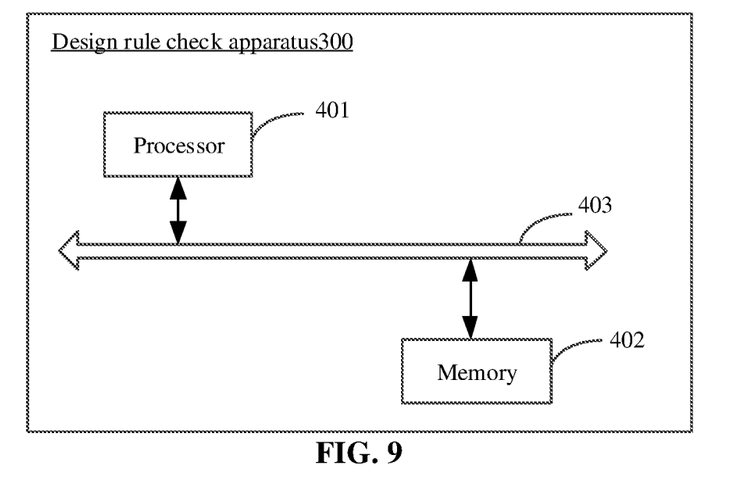
FIG. 9 is a structural diagram of hardware of a design rule check apparatus provided by an embodiment of the present application.

FIG. 9 is a structural diagram of hardware of a design rule check apparatus provided by an embodiment of the present application. As shown in FIG. 9, the design rule check apparatus 400 of the embodiment includes at least one processor 410 (FIG. 9 only shows one processor) and a memory 402.

The memory 402 is in communication connection with the at least one processor.

The memory 402 stores an instruction executable by the at least one processor 401. The instruction is executed by the at least one processor 401, so that the design rule check apparatus 400 can execute each step of the foregoing method embodiment.

In one or more embodiments, the memory 402 may be independent or may be integrated with the processor 401.

When the memory 402 is a device independent of the processor 401, the design rule check apparatus 400 further includes a bus 403, configured to connect the memory 402 and the processor 401.

The present application further provides a computer-readable storage medium. The computer-readable storage medium stores a computer execution instruction. When the computer execution instruction is executed by a processor, each step of the foregoing method embodiment is implemented.

The embodiment of the present application further provides a computer program product, which includes a computer program. When the computer program is executed by a processor, each step of the foregoing method embodiment is implemented.

The embodiment of the present application also provides a chip, which includes a processing module and a communication interface. The processing module can execute the technical scheme in the foregoing method embodiment.

Furthermore, the chip further includes a storage module (for example, a memory). The storage module is configured to store an instruction. The processing module is configured to execute the instruction stored by the storage module. The execution of the instruction stored in the storage module enables the processing module to execute the technical scheme in the foregoing method embodiment.

It will be appreciated that the processor mentioned in the embodiment of the present application may be a Central Processing Unit (CPU), and may also be other general purpose processors, a Digital Signal Processor (DSP), an Application Specific Integrated Circuit (App) an Application Specific Integrated Circuit (ASIC), a Field Programmable Gate Array (FPGA) or other programmable logic devices, a discrete gate or transistor logic device, a discrete hardware assembly, and the like. The general purpose processor may be a microprocessor or the processor may also be any conventional processor, and the like.

It will be further appreciated that the memory mentioned in the embodiment of the present application may be a volatile memory or a nonvolatile memory, or may include both the volatile memory and the nonvolatile memory. The nonvolatile memory may be a Read-Only Memory (ROM), a Programmable ROM (PROM), an Erasable PROM (EPROM), and an Electrically PROM (EEPROM), or a flash memory. The volatile memory may be a Random Access Memory (RAM), which is used as an external cache. By exemplary and not restrictive illustration, many forms of RAM are available, for example, a Static RAM (SRAM), a Dynamic RAM (DRAM), a Synchronous DRAM (SDRAM), a Double Data Rate Synchronous DRAM (DDR SDRAM), an Enhanced SDRAM (ESDRAM), a Synchlink DRAM (SLDRAM), and a Direct Rambus RAM (DR RAM).

The bus may be an Industry Standard Architecture (ISA) bus, a Peripheral Component (PCI) bus or an Extended Industry Standard Architecture (EISA) bus, and the like. The bus may be divided into an address bus, a data bus, a control bus, and the like. For ease of representation, the bus in the drawings of the present application is not limited to only one bus or one type of bus.

It is to be noted that when the processor is the general purpose processor, the DSP, the ASIC, the FPGA or other programmable logic device, the discrete gate or transistor logic device, or the discrete hardware assembly, the memory (the storage module) is integrated within the processor.

It is to be understood that the memory described herein is intended to include, but be not limited to, these and any other suitable types of memories.

It will be appreciated that in various embodiments of the present application, the magnitude of serial numbers in each above procedure is not meant to imply an order of execution. The order of execution of each procedure should be determined by a function and inherent logic thereof, and should not impose any limitation on an implementation procedure of the embodiment of the present application.

What is claimed is:

1. A design rule check method, comprising:
  acquiring a Design Rule Check (DRC) code file;
  analyzing a plurality of segments of DRC codes in the DRC code file to obtain derivative layer information of a design rule corresponding to each segment of the plurality of segments of the DRC codes, wherein the derivative layer information is used to indicate logic operations of the DRC codes, and when the logic operations of two segments of the plurality of segments of the DRC codes are the same, the design rules of the two segments are a same type of design rule;
  classifying the plurality of segments of the DRC codes after the analyzing according to a type of a design rule corresponding to each of the plurality of segments of the DRC codes to obtain a segment of DRC codes of each type of design rule;
  determining whether a numerical range field of a same check item in the segment of DRC codes of the each type of design rule is the same, and in a case where the numerical range field of the same check item is not exactly the same, determining that a code conflict exists in the segment of DRC codes; and
  in a case where the code conflict exists, generating a code conflict report, the code conflict report being used to indicate a code position of the code conflict.

2. The method according to claim 1, wherein the design rule comprises at least one design rule based on width and area of a semiconductor structure in a chip, distance, enclosure relationship and extension relationship between semiconductor structures in the chip.

3. The method according to claim 1, further comprising:
  determining whether code overlapping exists in the plurality of segments of the DRC codes, and in a case where the code overlapping exists, generating a code overlapping report, the code overlapping report being used to indicate a code position of the code overlapping.

4. The method according to claim 1, further comprising:
  receiving a DRC code update file, the DRC code update file comprising update to a DRC code of the DRC codes with the code conflict or code overlapping;
  updating the DRC code file according to the DRC code update file to obtain an updated DRC code file; and
  executing the updated DRC code file to generate a test pattern corresponding to the updated DRC code file, the test pattern being used to verify whether a chip design satisfies a design requirement.

5. A design rule check apparatus, comprising:
  at least one processor; and
  a memory in communication connection with the at least one processor,
  wherein the memory stores an instruction executable by the at least one processor,
  wherein when executing the instruction stored in the memory, the at least one processor is configured to:
    acquire a Design Rule Check (DRC) code file;
    analyze a plurality of segments of DRC codes in the DRC code file to obtain derivative layer information of a design rule corresponding to each segment of the plurality of segments of the DRC codes, wherein the derivative layer information is used to indicate logic operations of the DRC codes, and when the logic operations of two segments of the plurality of segments of the DRC codes are the same, the design rules of the two segments are a same type of design rule;
    classify the plurality of segments of the DRC codes after the analyzing according to a type of a design rule corresponding to each of the plurality of segments of the DRC codes to obtain a segment of DRC codes of each type of design rule; and
    determine whether a numerical range field of a same check item in the segment of DRC codes of the each type of design rule is the same, and in a case where the numerical range field of the same check item is not exactly the same, determine that a code conflict exists in the segment of DRC codes; and
    in a case where the code conflict exists, generate a code conflict report, the code conflict report being used to indicate a code position of the code conflict.

6. The apparatus according to claim 5, wherein the design rule comprises at least one design rule based on width and area of a semiconductor structure in a chip, distance, enclosure relationship and extension relationship between semiconductor structures in the chip.

7. The apparatus according to claim 5, wherein the at least one processor is further configured to:
  determine whether code overlapping exists in the plurality of segments of the DRC codes, and in a case where the code overlapping exists, generate a code overlapping report, the code overlapping report being used to indicate a code position of the code overlapping.

8. The apparatus according to claim 5, wherein the at least one processor is further configured to:
  receive a DRC code update file, the DRC code update file comprising update to a DRC code of the DRC codes with the code conflict or code overlapping;
  update the DRC code file according to the DRC code update file to obtain an updated DRC code file; and
  execute the updated DRC code file to generate a test pattern corresponding to the updated DRC code file, the test pattern being used to verify whether a chip design satisfies a design requirement.

9. A non-transitory computer-readable storage medium, storing computer program codes thereon,
  wherein the computer program codes are executable by a processor;
  wherein when executed by the processor, the computer program codes cause the processor to:
    acquire a Design Rule Check (DRC) code file;
    analyze a plurality of segments of DRC codes in the DRC code file to obtain derivative layer information of a design rule corresponding to each segment of the plurality of segments of the DRC codes, wherein the derivative layer information is used to indicate logic operations of the DRC codes, and when the logic operations of two segments of the plurality of segments of the DRC codes are the same, the design rules of the two segments are a same type of design rule;
    classify the plurality of segments of the DRC codes after the analyzing according to a type of a design rule corresponding to each of the plurality of segments of the DRC codes to obtain a segment of DRC codes of each type of design rule;
    determine whether a numerical range field of a same check item in the segment of DRC codes of the each type of design rule is the same, and in a case where the numerical range field of the same check item is not exactly the same, determine that a code conflict exists in the segment of DRC codes; and
    in a case where the code conflict exists, generate a code conflict report, the code conflict report being used to indicate a code position of the code conflict.

10. The non-transitory computer-readable storage medium according to claim 9, wherein the design rule comprises at least one design rule based on width and area of a semiconductor structure in a chip, distance, enclosure relationship and extension relationship between semiconductor structures in the chip.

11. The non-transitory computer-readable storage medium according to claim 9, wherein the computer program codes further cause the processor to:
  determine whether code overlapping exists in the plurality of segments of the DRC codes, and in a case where the code overlapping exists, generate a code overlapping report, the code overlapping report being used to indicate a code position of the code overlapping.

12. The non-transitory computer-readable storage medium according to claim 9, wherein the computer program codes further cause the processor to:
  receive a DRC code update file, the DRC code update file comprising update to a DRC code of the DRC codes with the code conflict or code overlapping;
  update the DRC code file according to the DRC code update file to obtain an updated DRC code file; and
  execute the updated DRC code file to generate a test pattern corresponding to the updated DRC code file, the test pattern being used to verify whether a chip design satisfies a design requirement.

\* \* \* \* \*